United States Patent [19]

Meadow et al.

[11] 4,073,868

[45] * Feb. 14, 1978

[54] CARBON BISULFIDE PRODUCTION

[75] Inventors: Morton Meadow, Trenton; Sidney Berkowitz, Highland Park, both of N.J.

[73] Assignee: FMC Corporation, Philadelphia, Pa.

[*] Notice: The portion of the term of this patent subsequent to Dec. 16, 1992, has been disclaimed.

[21] Appl. No.: 615,002

[22] Filed: Sept. 19, 1975

Related U.S. Application Data

[63] Continuation-in-part of Ser. No. 355,991, April 30, 1973, Pat. No. 3,927,185.

[51] Int. Cl.$^2$ .............................................. C01B 31/26
[52] U.S. Cl. .................................................. 423/443
[58] Field of Search ...................... 423/443, 563, 439; 23/277 R, 288

[56] References Cited

U.S. PATENT DOCUMENTS

| | | | |
|---|---|---|---|
| 2,492,719 | 12/1949 | Thacker | 423/443 |
| 2,548,015 | 4/1951 | Goodson et al. | 23/288 R |
| 2,777,759 | 1/1957 | Sokolik | 23/288 R |
| 2,882,130 | 4/1959 | Porter | 423/443 |
| 2,882,131 | 4/1959 | Getz et al. | 423/443 |
| 3,436,181 | 4/1969 | Berthoux et al. | 423/443 |
| 3,699,215 | 10/1972 | Gerin et al. | 423/443 |
| 3,927,185 | 12/1975 | Meadow et al. | 423/443 |

*Primary Examiner*—O. R. Vertiz
*Assistant Examiner*—Wayne A. Langel
*Attorney, Agent, or Firm*—Abner Sheffer; Frank Ianno

[57] ABSTRACT

Continuous process for producing carbon bisulfide by reaction of sulfur and hydrocarbon. A hydrocarbon stream is introduced into a sulfur stream and the hot reaction mixture is moved vertically from the zone of introduction and/or the streams are fed countercurrent to impinge on each other.

9 Claims, No Drawings

CARBON BISULFIDE PRODUCTION

This application is a continuation-in-part of our copending application Ser. No. 355,991 filed Apr. 30, 1973 (now U.S. Pat. No. 3,927,185 of Dec. 16, 1975), whose entire disclosure is incorporated herein by reference.

As disclosed in said application Ser. No. 355,991 a sulfur vapor stream and a stream of hydrocarbon gas comprising a multi-carbon hydrocarbon having at least 3 carbon atoms are brought together under such flow conditions and mixing conditions that the hydrocarbon stream becomes substantially completely mixed with sulfur vapor before the hydrocarbon comes into contact with a solid surface in the reaction zone, such as a heated wall thereof, so that a non-catalytic reaction occurs between substantially all the higher hydrocarbon and sulfur prior to such contact. This rapid initial mixing may be attained by using a stream of sulfur which moves substantially vertically, as by using a tubular reactor whose walls are substantially vertical rather than horizontal, thereby minimizing the effects of stratification of the streams and consequent contact between unreacted hydrocarbon and the walls of the tube. The sulfur vapor is much denser than the hydrocarbon under the conditions of the reaction and this density difference is accentuated, under the high pressures preferably used in the practice of this invention; that is, increased pressure increases the average molecular weight of the sulfur (more $S_8$ and $S_6$ are formed at the expense of $S_2$). While the sulfur stream moves downward in the Examples below, an upwardly moving sulfur stream may be used instead, with both co-current and counter-current operation, or with the hydrocarbon stream being introduced horizontally (preferably at a point or points spaced from the walls of the tube).

The use of counter-current mixing which can give extremely high turbulence to provide rapid mixing is another aspect of this invention, and it is within the broader scope of the invention to employ counter-current mixing not only with vertical operation as described above, but also with horizontally moving colliding streams.

The reaction conditions, e.g. temperature, pressure and time, are such as to effect the reaction of the hydrocarbon and sulfur to form carbon bisulfide. Preferably they will be such that the calculated mixing temperature (as defined in said Ser. No. 355,991) is at least about 540° C. The upper limit will depend on the particular materials of construction which are employed. Preferably it is below about 800° C, more preferably less than about 750° C and still more preferably not over about 700° C. The reactor walls are desirably at temperatures below about 800° C, more preferably below but 750° C, and above 550° C or 600° C such as about 650° to 700° C.

The following Examples are given to illustrate this invention further. In the Examples the volumes given represent, in accordance with standard practice, the volume calculated to standard conditions (STP) of a temperature of 0° C and an absolute pressure of 760 mm Hg. Residence times are given in seconds and are equal to 3600 divided by "space velocity" (S.V.) expressed in hours$^{-1}$; S.V. is the quotient of the total volume (in liters) of reactants at STP (with sulfur calculated as $S_2$) per hour, divided by the reactor volume (in liters).

EXAMPLE I

In this Example a narrow stream of propane heated to 425° C is injected countercurrent concentrically into a much wider stream of sulfur preheated to 700° C to react substantially adiabatically at a pressure of about 40 psig. The flow rates are so controlled that the amount of sulfur is about 34% in excess of that required for the stoichiometric reaction with the propane to form carbon bisulfide. The reaction is effected in a short reactor, the residence time therein being 0.61 second, and the reaction mixture is then immediately quenched, first in a vessel at 140° C (thereby condensing the sulfur in the reaction mixture). The non-condensed gases, including carbon bisulfide, then pass through a pressure-regulator (set to provide a back pressure of 3.7 atmospheres, i.e., 40 psig) from which the gases are passed to a condenser at 0° C and under pressure to condense carbon bisulfide; non-condensed gases are vented at atmospheric pressure. The propane is injected through a 0.318 cm diameter circular orifice into the stream of sulfur flowing in a circular pipe having an internal diameter of 2.09 cm.

The calculated mixing temperature is about 675° C.

The propane is converted substantially quantitatively (over 99%) and analysis of the condensed carbon bisulfide indicates that it has a purity of 99.89%, about 0.02% of benzene, about 0.09% of thiophene and no toluene. The condensed sulfur contains only traces of carbonaceous material.

More specifically, the reactor is a vertical 45.6 cm long section of stainless steel pipe, specifically Schedule 40, 3/4 inch IPS pipe, into which a hydrocarbon-introduction tube having an outside diameter of 0.635 cm projects from the side. The end of that tube is closed and the upstream side of the tube, adjacent the closed end, is machined to form a smooth flat upstream face arranged perpendicular to the flow path of the sulfur through the larger pipe; into that face the 0.318 cm diameter orifice is drilled. There is a bend in the pipe (through which the hot sulfur vapor is supplied) upstream of the vertical reaction section (in which the hydrocarbon-introduction tube is situated); the bend is about 30 cm upstream of the hydrocarbon-introduction orifice. The reactor is situated in a furnace, whose temperature is about 700° C. The sulfur and propane are fed to the reactor (from storage vessels maintained at pressures of about 100 psig, through suitable preheaters and flow control devices) at rates of 760 g per hour of sulfur and 39.8 liters (at STP) per hour of propane. (The terms "upstream" and "downstream" are used with reference to the direction of flow of the sulfur and of the resulting reaction mixture which is downward in the Example).

EXAMPLE II

Example I is repeated, using a mixture of propane and $H_2S$ in a 1:2 volumetric ratio in place of the pure propane; in this case the sulfur excess with respect to stoichiometry is 300%.

The calculated mixing temperature is aobut 690° C.

Here again there is a substantially quantitative conversion of propane. Analysis of the condensed carbon bisulfide indicates that it is over 99.99% pure, contains about 0.0055% benzene, 0.0002% thiophene and no toluene. The condensed sulfur is bright yellow with no trace of tars.

Specifically the feed rates are 760 g per hour of sulfur, 13.3 liters (at STP) per hour of propane and 26.6 liters (at STP) per hour of $H_2S$.

EXAMPLE III

Example I is repeated, using a mixture of n-hexane and $H_2S$ in a 1:3 volumetric ratio in place of pure propane (in this case the sulfur excess with respect to stoichiometry is 100%), a residence time of 0.58 second, a sulfur preheat temperature of 650° C a preheat temperature of the hexane-$H_2S$ feed to 200° C.

The calculated mixing temperature is about 620° C.

Conversion of hydrocarbon to carbon bisulfide is 97 per cent. Subsequent inspection of the reactor shows no evidence of carbonaceous impurities. Analysis of the condensed carbon bisulfide indicates that it contains some 3.66% of benzene, 0.35% of thiophene and 0.002% of toluene. The condensed sulfur appears clear and bright.

The subsequent inspection of the reactor also shows a considerable accumulation of scale (owing to the effects of a large number of previous runs at various conditions). It is believed that the level of impurities in the carbon bisulfide is largely due to the surface effect because of this scale accumulation. It is preferable to operate with a smooth surfaced reactor. However, even with this scaly reactor the walls are free of carbon deposits after the run.

EXAMPLE IV

Example I is repeated, using an LPG mixture (made up largely of butanes and propane, as described below) on place of the pure propane, with a sulfur excess of 150% with respect to stoichiometry, a residence time of 0.58 second, a sulfur preheat temperature of 700° C and a hydrocarbon preheat temperature of 200°C.

The calculated mixing temperature is about 685° C.

Conversion of hydrocarbon to carbon bisulfide is 99.8%. Analysis of the condensed carbon bisulfide indicates that it contains 0.0834% benzene, 0.0425% thiophene, 0.0003% toluene and no higher molecular weight constituents. The condensed sulfur appears clear and bright.

The LPG mixture (Phillips LPG Mixture No. 31) has the following composition (in which all numbers are mol percents): ethane 0.01, propane 36.94, isobutane 16.11, n-butane 44.83, n-pentane 0.01, isopentane 2.04, trans-butene-2 0.02, cis-butene-2 0.01, isopropylfluoride 0.03.

EXAMPLE V

Example I is repeated, using n-butane in place of the pure propane, with a sulfur excess of 100% with respect to stoichiometry, a residence time of 0.58 second, a sulfur preheat temperature of 700° C. and a hydrocarbon preheat temperature of 200° C.

The calculated mixing temperature is about 675° C.

Conversion of hydrocarbon to carbon bisulfide is 99.8 percent. Analysis of the condensed carbon bisulfide indicates that it contains 0.245% benzene, 0.1% thiophene, 0.002% toluene and 0.002% higher molecular weight constituents. The condensed sulfur appears clear and bright.

EXAMPLE VI

Example I is repeated, using n-pentant (practical grade) in place of the pure propane, with a sulfur excess of 50% with respect to stoichiometry, a residence time of 0.58 second, a sulfur preheat temperature of about 630°–650°, hydrocarbon preheat temperature of 200° C., an orifice of 0.16 cm diameter, and a pressure of 4.4 atmospheres (60psig) in the reactor.

The calculated mixing temperature is about 605° C.

Conversion of hydrocarbon to carbon bisulfide is 99 percent. Analysis of the condensed carbon bisulfide indicates that it contains 0.35% benzene, 0.68% thiophene, 0.0008% toluene and 0.0011% higher molecular weight constituents. The condensed sulfur appears clear and bright.

EXAMPLE VII

Example I is repeated, using an aliphatic petroleum naphtha (containing heptane, methylcyclohexane and toluene as principal constituents) in place of the pure propane, with a sulfur excess of 100% with respect to stoichiometry, a residence time of 1.35 seconds, a sulfur preheat temperature of 650° C and a hydrocarbon preheat temperature of 200° C. In this case, however, the hydrocarbon-introduction tube is positioned with its flat face (and orifice) facing downstream so that the flow of hydrocarbon is cocurrent with the sulfur.

The calculated mixing temperature is about 620° C.

Conversion of hydrocarbon to carbon bisulfide is 94 percent. Analysis of the condensed carbon bisulfide indicates that it contains 5.44% benzene, 0.19% thiophene, no toluene and 0.0002% higher molecular weight constituents. The condensed sulfur appears clear and bright.

The approximate composition of the naphtha in mol percent is: 2-methylhexane 0.3; 2,3-dimethylpentane plus 1,1-dimethylcyclopentane 0.2; trans-1,3-dimethylcyclopentane 1.0; cis-1,3-dimethylcyclopentane 0.6; trans-1,2-dimethylcyclopentane 0.5; isooctane 1.5; n-heptane 25.0; cis-1,2-dimethylcyclopentane 1.9; methylcyclohexane 44.3; ethylcyclopentane 0.2; 2,5-dimethylhexane 2.3; 3,3-dimethylpentane 1.2; toluene 10.2; 2,3,4-trimethylpentane 2.9, 1,1,2-trimethylcyclopentane 0.7; others 7.2.

EXAMPLE VIII

Example I is repeated, using a mixture of 1 mol of propane and 3 mols of propylene in place of the pure propane, with a sulfur excess of 112% with respect to stoichiometry, a residence time of 0.61 seconds, a sulfur preheat temperature of 700° C and a hydrocarbon preheat temperature of 415° C and a hydrocarbon-introduction orifice having a diameter of 0.102 cm.

The calculated mixing temperature is about 680° C.

Conversion of hydrocarbon is over 99%. Analysis of condensed carbon bisulfide indicates that it contains 0.0466% benzene, 0.0118% thiophene, no toluene.

EXAMPLE IX

Example I is repeated, using methane in place of the pure propane, with a sulfur excess of 150% with respect to stoichiometry, a residence time of 0.59 second, a sulfur preheat temperature of 700° C and a hydrocarbon preheat temperature of 415° C.

The calculated mixing temperature is about 680° C.

Conversion of hydrocarbon is about 91%. Analysis of the condensed carbon bisulfide indicates that it contains 0.003% benzene, 0.004% thiophene, no toluene.

In Examples III, IV, VI, VII, VIII and IX the sulfur feed rates in grams per hour are 760, 850 832, 855, 760, 840 and 760, respectively, and the hydrocarbon feed rates (in grams per hour unless indicated otherwise) are 53.4 hexane, 47.2 LPG, 58 butane, 80.2 pentane, 53.8 naphtha, 7.5 liters (STP) propane and 22.4 liters (STP)

propylene per hour, 54 liters (STP) methane per hour. In these Examples, simple calculation shows that the linear velocity of the hydrocarbon stream emerging from the orifice is considerably greater than the linear velocity of the sulfur steam; thus for Example VI the pentane linear velocity is well over twice the sulfur linear velocity, specifically about 30.9 cm per second vs about 6.7 cm per second.

The mixing temperature can be calculated from the heat contributed by each feed component, assuming adiabatic mixing (no additional heat supplied by, or lost from, the outside during mixing) and no chemical reaction (it may be termed the "adiabatic non-reaction mixing temperature"). At this mixing temperature the sum of the gains and losses in enthalpy by the various feed components in reaching that temperature is zero; thus, for a two-component mixture the heat gained by one component is equal to the heat lost by the other. The gain or loss in enthalpy can be readily determined on the basis of published thermodynamic data.

For instance, the enthalpy of propane (in BTU per pound mol) as a function of temperature ("T", in degrees Kelvin) may be expressed as follows: $-49,409.318 - 1.739T + 6.551 \times 10^{-2}T^2 - 2.254 \times 10^{-5}T^3$; this formula is based on thermodynamic data given by Kobe et al in a series of articles on the thermochemistry of petrochemicals in Petroleum Refiner January 1949 to July 1958. (It will be apparent that, since the first term, $-49,409.318$, is not affected by temperature and since the number of mols of propane before and after mixing is the same, this first term has no effect on the calculation). The effect, on the enthalpy, of the change in the partial pressure of propane owing to mixing is negligible and is disregarded since it has no significant effect on the calculation (the propane behaves essentially as a perfect gas under the conditions of operation).

The calculation of the enthalpy change for the sulfur requires additional steps, because sulfur exists in various molecular forms, such as $S_2$, $S_6$ and $S_8$ (while other sulfur species exist, disregarding them has no significant effect on the calculation). For $S_2$ the enthalpy (in BTU per pound mol) is $51,986.842 + 11.698T + 4.768 \times 10^{-3}T^2 - 2.338 \times 10^{-6}T^3$; and for $S_6$ it is $39,463.695 + 34.6T + 2.376 \times 10^{-3}T^2$; and for $S_8$ it is $35,065.98 + 45.00T + 3.168 \times 10^{-3}T^2$. See for instance K.K. Kelly, U.S. Bureau of Mines Bulletin 406.5 (1937). The distribution (relative proportions) of the various sulfur species depends on the pressure and temperature and can be calculated from known thermodynamic data, such as given by Kelly. Thus the distribution of S molecules in the incoming sulfur stream (whose temperature and pressure is known) can be determined by a trial and error method (as by repeated iterations on a computer). That is, a distribution is assumed and its correctness is checked mathematically by the use of known kinetic constants (given by Kelly) relating to the conversion of one form of sulfur into another; based on those calculations, another assumed distribution is chosen and the process of calculation and choice is continued until the correct value is obtained.

The mixing temperature can be calculated by a double set of trial-and-error computations. That is, a mixing temperature is assumed and, from the known number of mols of substances other than sulfur in the feed (e.g. propane) and the known weight of sulfur in the feed, one can calculate (by trial-and-error as described above) the distribution of the various sulfur species in the mixture at that assumed mixing temperature. From this, the changes in enthalpies at the assumed mixing temperature are calculated; based on that calculation a new assumed mixing temperature is chosen, a new sulfur distribution is calculated (again by trial-and-error, as above) and the changes in enthalpies at that new assumed mixing temperature are calculated; and the process of calculation and choice is repeated (as by repeated iterations on a computer) until a temperature is found at which the sum of the enthalpy changes for the feed components is zero.

While the formulas for enthalpies are given above in terms of BTU per pound mol, the very same formulas may be employed for metric units. That is, in the calculation the units in which the formulas are expressed (whether BTU per pound mol or calories per gram mol) become immaterial.

It is found that the calculated mixing temperature is affected significantly by the pressure; thus, if propane is preheated to 200° C and supplied at the rate of 153.3 pounds per hour and sulfur is preheated to 600° C and supplied at the rate of 1823 pounds per hour (stoichiometrically, a 63% excess of sulfur), at atmospheric pressure the calculated mixing temperature is about 574° C, at 2 atmospheres pressure it is about 563° C, and at 4 atmospheres it is about 549° C. The pressure in the reactor is preferably within the range of 3.5 to 12 atmospheres, more preferably about 5 to 10 atmospheres.

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

We claim:

1. Process for producing carbon bisulfide by the reaction of sulfur and a hydrocarbon in gaseous state in which a stream of higher hydrocarbon gas comprising a higher hydrocarbon having at least 3 carbon atoms is introduced into a stream of sulfur vapor in a reactor to form a hot reaction mixture whereby to react on-catalytically said sulfur and hydrocarbon to form carbon bisulfide in said reactor, said reactor having solid walls, wherein the improvement comprises moving said reaction mixture vertically from the zone of introduction of said hydrocarbon stream, the flow conditions and mixing conditions of the sulfur stream and hydrocarbon stream being such that the hydrocarbon stream becomes substantially completely mixed with sulfur vapor before the hydrocarbon comes into contact with a solid surface in the reaction zone, so that a non-catalytic reaction occurs between substantially all the higher hydrocarbon and sulfur prior to such contact.

2. Process as in claim 1 in which said hydrocarbon is principally saturated multicarbon hydrocarbon having at least 3 carbon atoms and the average number of carbon atom in the hydrocarbon is less than 8.

3. Process as in claim 2 in which the reaction zone comprises a tubular reaction chamber through which the stream of hot sulfur vapor is fed and into which the stream of hydrocarbon gas is introduced through an orifice, said tubular chamber having a diameter which is more than 5 times the diameter of said orifice.

4. Process as in claim 3 in which said tubular reactor has solid vertical walls and the temperature of the walls of the reaction chamber is below about 750° C.

5. Process as in claim 1 in which the walls of said reactor are at a temperature above 550° C. and below about 750° C.

6. Process as in claim 5 in which said walls are at 650° to 700° C.

7. Process as in claim 1 in which the calculated mixing temperature is at least about 540° C.

8. Process as in claim 1 in which said reactor comprises a duct having substantially vertical walls and through which a stream of sulfur vapor moves substantially vertically, the stream of hydrocarbon being introduced into the sulfur vapor at a point spaced from said walls.

9. Process for producing carbon bisulfide by the reaction of sulfur and a hydrocarbon in gaseous state, wherein the improvement comprises feeding to a reaction zone a stream of sulfur vapor and a stream of hydrocarbon gas comprising a higher hydrocarbon having at least 3 carbon atoms counter-current to impinge said streams on each other in said reaction zone at a temperature at which the reaction said sulfur and said hydrocarbon to form carbon bisulfide occurs, and in which said reaction zone is at a pressure of at least 3.5 atmospheres, said hydrocarbon stream being directed substantially head-on at said sulfur vapor stream, said sulfur vapor stream is passed downstream through a tube within which a stream of said hydrocarbon is directed substantially axially of said tube and the resulting mixture passes through said tube downstream of the point at which said hydrocarbon stream comes into contact with the sulfur, the temperature of the walls of said tube is below about 750° C, the flow conditions and mixing conditions of the sulfur stream and hydrocarbon stream being such that the hydrocarbon stream becomes substantially completely mixed with sulfur vapor before the hydrocarbon comes into contact with a solid surface in the reaction zone, so that a noncatalytic reaction occurs between substantially all the higher hydrocarbon and sulfur prior to such contact.

* * * * *

UNITED STATES PATENT AND TRADEMARK OFFICE
CERTIFICATE OF CORRECTION

PATENT NO. : 4,073,868
DATED : February 14, 1978
INVENTOR(S) : Morton Meadow and Sidney Berkowitz It is certified that error appears in the above-identified patent and that said Letters Patent are hereby corrected as shown below:

Column 1, line 56, "but" should read --about--. Column 2, line 59, "aobut" should read --about--. Column 3, line 31, "on place" should read --in place--; line 58, "0.245%" should read --0.0246%--; line 64, "n-pentant" should read --n-pentane--. Column 4, line 63, "IV, VI" should read --IV, V, VI--. Column 6, line 40, "a stream of higher hydrocarbon" should read --a stream of hydrocarbon--; lines 43-44, "on-catalytically" should read --non-catalytically--. Column 8, line 1, "reaction said sulfur" should read --reaction of said sulfur--.

Signed and Sealed this

Twentieth Day of June 1978

[SEAL]

Attest:

RUTH C. MASON
Attesting Officer

DONALD W. BANNER
Commissioner of Patents and Trademarks